US012064859B1

(12) United States Patent
Ho

(10) Patent No.: US 12,064,859 B1
(45) Date of Patent: Aug. 20, 2024

(54) CONSTANT TORQUE MODULE FOR POWER TOOL

(71) Applicant: Chuan-Cheng Ho, Taichung (TW)

(72) Inventor: Chuan-Cheng Ho, Taichung (TW)

( * ) Notice: Subject to any disclaimer, the term of this patent is extended or adjusted under 35 U.S.C. 154(b) by 0 days.

(21) Appl. No.: 18/201,245

(22) Filed: May 24, 2023

(51) Int. Cl.
*B25F 5/00* (2006.01)
*B25B 21/02* (2006.01)

(52) U.S. Cl.
CPC .............. *B25F 5/001* (2013.01); *B25B 21/02* (2013.01)

(58) Field of Classification Search
CPC ........................................................ B25F 5/001
See application file for complete search history.

(56) References Cited

U.S. PATENT DOCUMENTS 9,975,226 B2 * 5/2018 Wei ..................... B25B 23/1405

* cited by examiner

*Primary Examiner* — Nathaniel C Chukwurah
(74) *Attorney, Agent, or Firm* — Birch, Stewart, Kolasch & Birch, LLP

(57) ABSTRACT

A constant torque module for a power tool includes a transmission ring member, which has a core shaft, two accommodations and two drive blocks, two buffer units disposed respectively in parts of the accommodations such that each of the two accommodations remains a receiving space, an internal shaft member, which has two inner protrusions extending into the receiving spaces and being contactable with the two buffer units respectively, a shaft notch engaged with the core shaft, and a shaft rod having an engagement portion, and an external shaft member including two outer protrusions contactable with the two drive blocks respectively, and a shaft tube having an engagement notch engaged with the engagement portion of the internal shaft member. As such, the constant torque module outputs different torques when it rotates in reverse directions and has the advantages of high rotational speed, good working efficiency and low manufacturing cost.

9 Claims, 12 Drawing Sheets

CONSTANT TORQUE MODULE FOR POWER TOOL

BACKGROUND OF THE INVENTION

1. Field of the Invention

The present invention relates generally to a power tool and more particularly, to a constant torque module for a power tool.

2. Description of the Related Art

A conventional power tool, such as pneumatic tool, electric tool, or hydraulically driven tool, is usually composed of a rotating shaft connectable with a tool head, such as a socket or a screw bit, for rotating components or parts, such as bolts or nuts. When the rotating shaft reversely rotates to loosen the nut or bolt, the power tool should provide as much torque as possible to smoothly unscrew the nut or bolt. However, when the user would like to tighten the nut or bolt, the torque outputted by the rotating shaft should be controlled in an appropriate range, thereby preventing the damage to the bolts or nuts or preventing the difficulty in loosening the thus tightened bolts or nuts due to exceeding tightening force exerting thereon. Moreover, in many applications, such as in the task of mounting wheel frames, the torque exerting on each of a plurality of nuts used at the same time must be consistent; otherwise, the uneven stress may cause accidents that some nuts are easy to loosen after receiving vibration for a long time.

At present, there are pneumatic tools that utilize the oil pressure or a planetary gear reduction mechanism to control the torque of the output shaft. However, such kind of design usually has the disadvantages of restrict requirement in structure processing accuracy to cause high manufacturing cost, and lower rotational speed to cause poor working efficiency. Therefore, how to control the magnitude of the output torque under high rotational speed, and how to provide an easily made structure to lower the manufacturing cost have become a technical task to be solved in the industry.

SUMMARY OF THE INVENTION

The present invention has been accomplished in view of the above-noted circumstances. It is an objective of the present invention to provide a constant torque module for a power tool, which can output different magnitudes of torque when it rotates in clockwise and counterclockwise directions.

It is another objective of the present invention to provide a constant torque module for a power tool, which can work under high rotational speed to achieve high working efficiency and can be made with reduced manufacturing cost.

To attain the above objectives, the present invention provides a constant torque module adapted to be used for a power tool having an output portion. The constant torque module comprises a transmission ring member, two buffer units, an internal shaft member, and an external shaft member. The transmission ring member incudes a main body, a coupling portion extending from the main body for being coupled with the output portion of the power tool, a core shaft extending from a lateral side of the main body opposite to the coupling portion, two accommodations provided at the main body and located at two lateral sides of the core shaft, and two drive blocks extending from the main body in a way that each of the two drive blocks is farther from the core shaft than each of the two accommodations is. Each of the two buffer units is disposed in a part of one of the two accommodations such that each of the two accommodations remains a receiving space. The internal shaft member includes an inner disc body, two inner protrusions extending from the inner disc body into the receiving spaces respectively, a shaft notch provided at the inner disc body and engaged with the core shaft of the transmission ring member, a shaft rod extending from a lateral side of the inner disc body opposite to the two inner protrusions, and an engagement portion provided at a terminal end of the shaft rod. The external shaft member includes an outer disc body, two outer protrusions extending from the outer disc body towards the main body of the transmission ring member and located outside an outer periphery of the inner disc body, a shaft tube extending from a lateral side of the outer disc body opposite to the two outer protrusions, a drive portion provided at a terminal end of the shaft tube, a shaft hole recessed from the outer disc body into an inside of the shaft tube and inserted with the shaft rod of the internal shaft member, and an engagement notch provided at an inner end of the shaft hole and engaged with the engagement portion of the internal shaft member. The inner disc body is located between the outer disc body and the main body of the transmission ring member. When the transmission ring member is rotated in a first direction, the two drive blocks are in contact with the two outer protrusions respectively to transmit a rotational force to the external shaft member. When the transmission ring member is rotated in a second direction reverse to the first direction, the two buffer units are in contact with the two inner protrusions respectively to transmit a reverse rotational force to the internal shaft member and then the external shaft member through the engagement portion and the engagement notch.

With the above structural features, the constant torque module can output different magnitudes of torque when the transmission ring member is driven to rotate in clockwise direction (the second direction) and counterclockwise direction (the first direction), and can work under high rotational speed with high working efficiency and low manufacturing cost.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
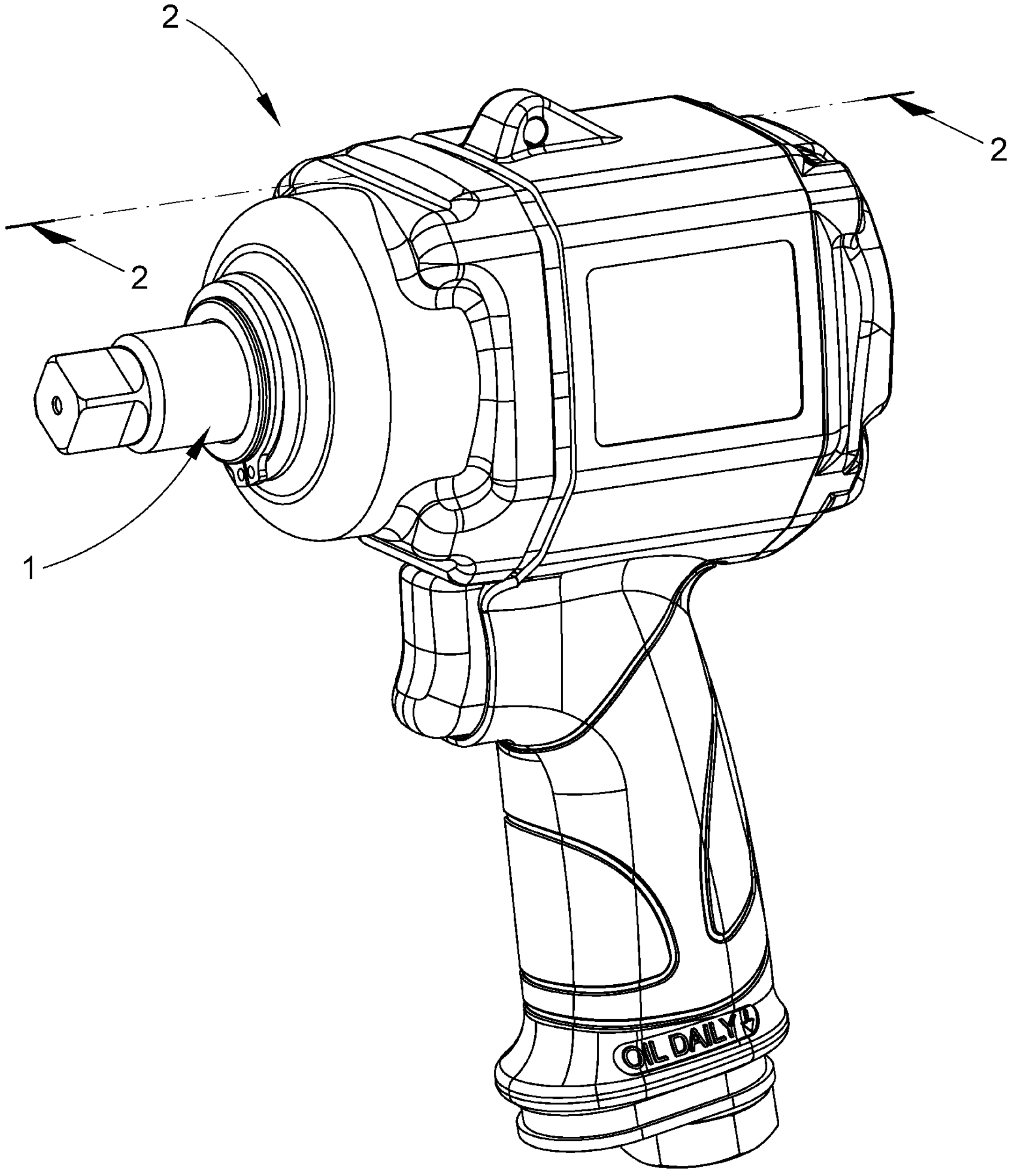
FIG. 1 is a perspective view of a power tool equipped with a constant torque module according to a first embodiment of the present invention.

The structure and technical features of the present invention will be detailedly described hereunder by three embodiments and accompany drawings. As shown in FIGS. 1-4, a constant torque module 1 in accordance with a first embodiment of the present invention is provided. In this embodiment, the constant torque module 1 is built in a power tool 2 which may be driven by a power source of electricity, compressed air, hydraulic oil, or the like. In this embodiment, the power tool 2 is realized as a pneumatic tool.

The power tool 2 uses a pneumatic motor 3 to drive an impact unit such that the rotational force from the pneumatic motor 3 is transmitted forward through the impact unit. To better illustrate the present invention, the direction denoted by the arrow F in FIG. 2 will be referred to as the front direction hereinafter, and the direction denoted by the arrow B will be referred to as the rear direction. The impact unit serves as the output portion 4 of the power tool 2 for outputting the rotational force of the pneumatic motor 3. Because the pneumatic motor and the impact unit of the power tool are not the primary technical features of the present invention, details of the aforesaid mechanisms will not be necessarily given hereinafter. In other embodiment, the power tool may omit the impact unit, and in this case the output shaft 5 of the pneumatic motor 3 or other element will directly serve as the output portion 4 of the power tool 2.

The constant torque module 1 is composed of a transmission ring member 10, two buffer units 20, an internal shaft member 30, and an external shaft member 40.

The transmission ring 10 is made by processing a metal block, and comprises a main body 11 shaped like a short cylinder, a coupling portion 12 extending backwards from the main body 11 for being coupled with the output portion 4, a core shaft 14 extending forwards from a lateral side (i.e., the front side) of the main body 11 opposite to the coupling portion 12, two accommodations 16 provided at the main body 11 and located at two lateral sides of the core shaft 14 respectively, and two drive blocks 18 extending forwards from the main body 11 in a way that each of the two drive blocks 18 is farther from the core shaft 14 than each of the two accommodations 16 is. Further, the coupling portion 12 includes a shaft rod 121 and two impact receiving blocks 122 extending from the shaft rod 121 for receiving the intermittence impact force from the impact unit. The structure of the coupling portion 12 may be varied in association with the structure of the output portion 4 as long as the coupling portion 12 has a non-circular cross-sectional outer periphery that can receive the rotational force form the output portion 4. The core shaft 14 is located at the rotational center of the main body 11. The two accommodations 16 have a same profile and are arranged symmetrical to the core shaft 14. The two drive blocks 18 are arranged outside the two accommodations 16 at the places symmetrical to the core shaft 14 and each shaped like an arc strip. However, the shapes of the accommodations 16 and the drive blocks 18 may be varied in accordance with actual need.

Figure 7A:
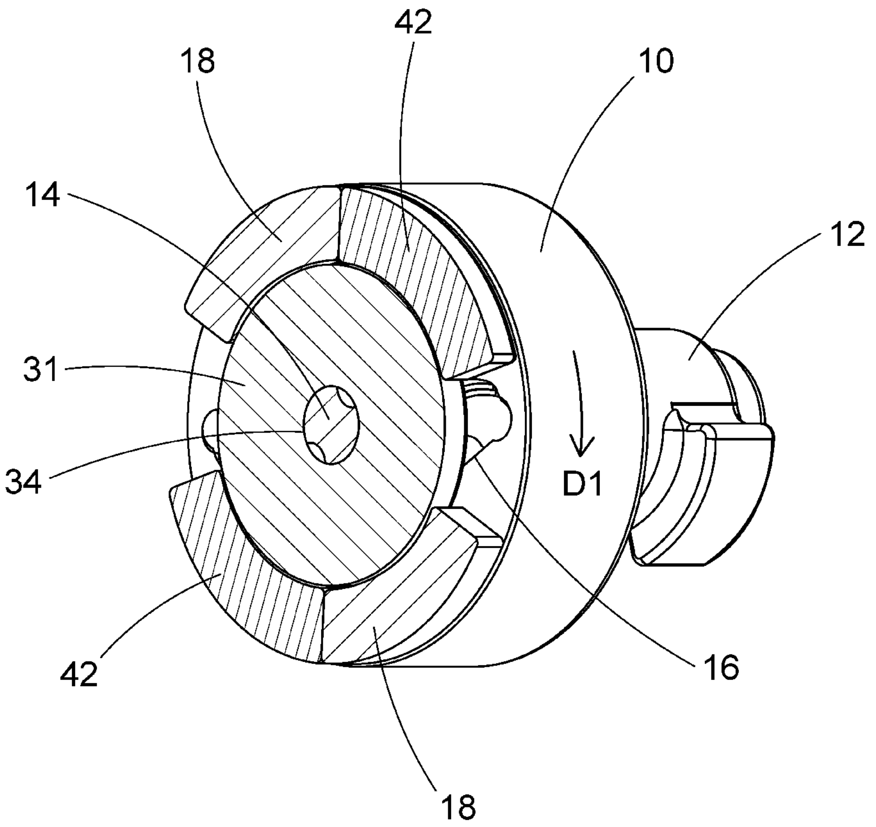
FIGS. 7*a* and 7*b* are schematic cutaway views showing the constant torque module is rotated in a first direction.
Figure 7B:
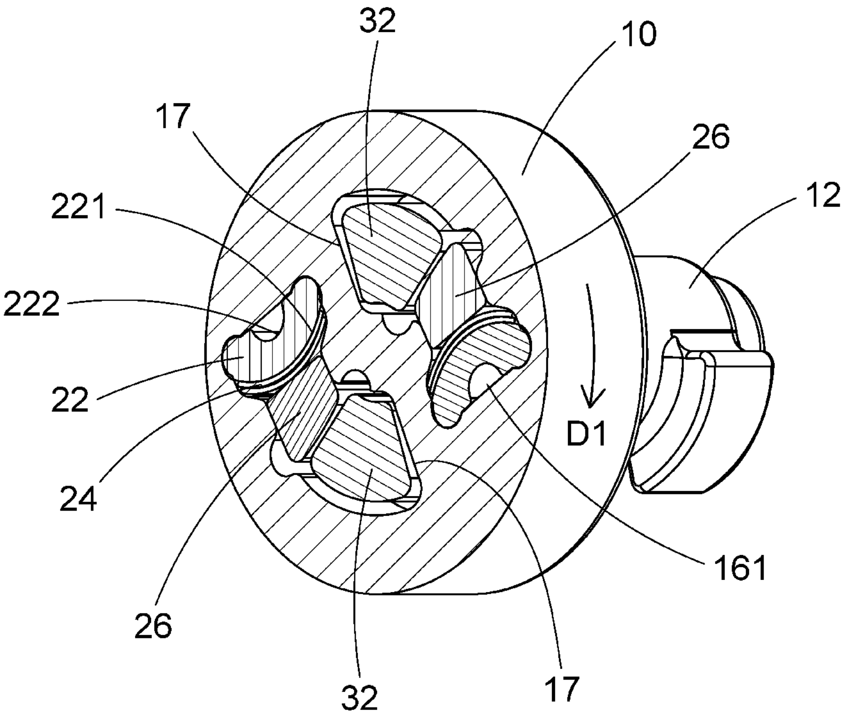

Each of two buffer units 20 is disposed in a part of one of the two accommodations 16 such that each of the two accommodations 16 remains a receiving space 17. Each buffer unit 20 comprises an arc-shaped elastic member 22, two arc-shaped spring pieces 24, and a pad member 26. The elastic member 22 is made of nature or synthetic polymer, such as rubber or silicon material, such that the elastic member 22 is deformable to absorb the impact and to provide buffer effect. The two spring pieces 24 are made of metal material, and parallelly arranged and abutted against a convex side 221 of the elastic member 22. A concave side 222 of the elastic member 22 is distanced from the inner wall of the accommodation 16 to preserve a gap 161 therebetween, as shown in FIG. 7*b*, thereby allowing a greater range of deformation of the elastic member 22 so as to provide more buffer space. Further, the because the two spring pieces 24 are supported by the elastic member 22, a better buffer effect can be provided. The pad member 26 is made of metal material and has a certain thickness, such that the pad member 26, which can provide a better impact resistance, can protect the spring pieces 24 from damage due to continuous impacts.

The internal shaft member 30 includes a circle-shaped inner disc body 31, two inner protrusions 32 extending backwards from the inner disc body 31 into the receiving spaces 17 respectively, a shaft notch 34 provided at a rear side of the inner disc body 31 and engaged with the core shaft 14 of the transmission ring member 10, a shaft rod 35 extending forwards from a lateral side (front side) of the inner disc body 31 opposite to the two inner protrusions 32, and an engagement portion 38 provided at a terminal end 36 of the shaft rod 35. The two inner protrusions 32 are shaped like arc strips and neighbored to the pad members 26 respectively, such that each of the pad members 26 is located between the spring pieces 24 and the inner protrusion 32. In another embodiment, if the two spring pieces 24 are designed to have sufficient thickness, the pad members 26 may be omitted. In this case, the two spring pieces 24 are arranged between elastic member 22 and the inner protrusion 32 in a way that each of the elastic member 22 and the spring pieces 24 has a convex side protruding towards the inner protrusion 32. The core shaft 14 extends into the shaft notch 34, ensuring that the internal shaft member 30 and the transmission ring member 10 will synchronously and coaxially rotate. Furthermore, the shaft rod 35 of the internal shaft member 30 has two end sections and a middle section 37 connected between the two end sections in a way that the diameters of the two end sections are greater than a diameter of the middle section 37. With this design of the shaft rod 35, the middle section 37 having a small diameter may be twisted and deformed upon receiving external force so as to absorb a part of the torque and to maintain sufficient structural strength, thereby prevent break of the shaft rod 35 upon receiving rotational force. The engagement portion 38 is provided with two cut flat surfaces 39. However, as long as the engagement portion 38 has a non-circular cross-sectional outer periphery, the rotational force can be transmitted to the external shaft member 40, which will be detailedly illustrated hereinafter.

Figure 5:
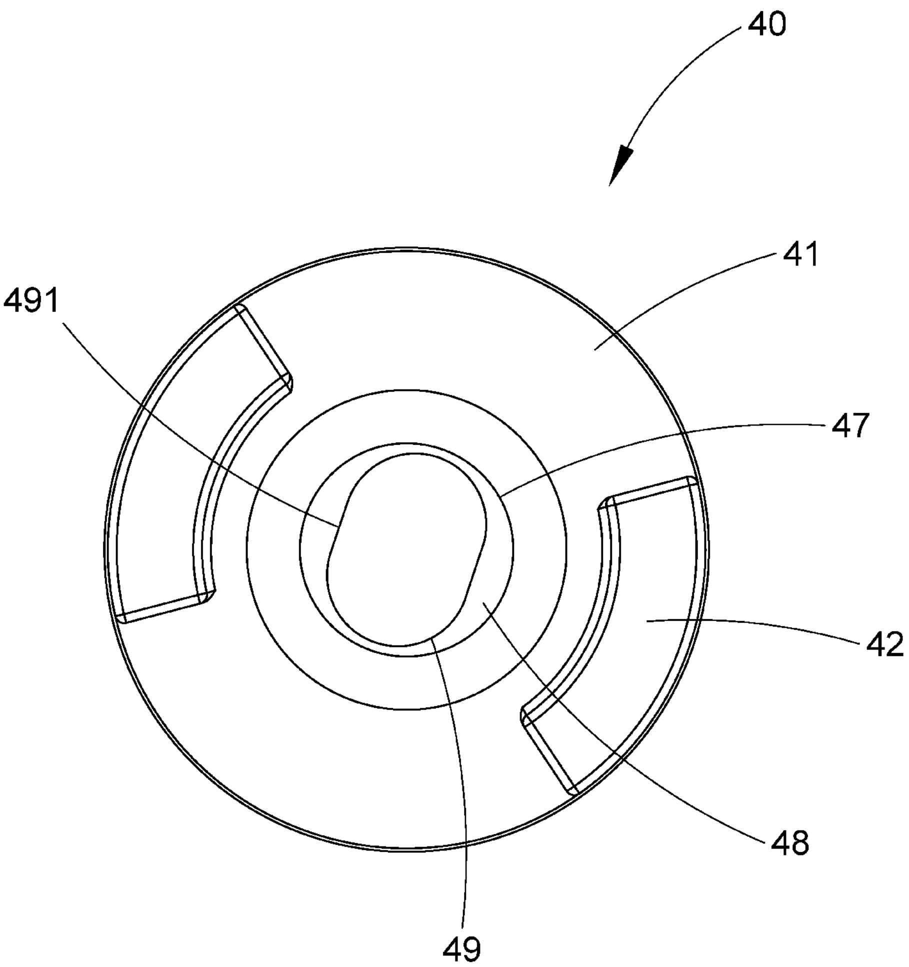
FIG. 5 is a right side elevational view of an external shaft member of the constant torque module of the first embodiment of the present invention.

The external shaft member 40 includes a circle-shaped outer disc body 41, two outer protrusions 42 extending from the outer disc body 41 towards the main body 11 of the transmission ring member 10 (i.e., extending backwards) and located outside an outer periphery of the inner disc body 31, a shaft tube 44 extending forwards from a lateral side (front side) of the outer disc body 41 opposite to the two outer protrusions 42, a drive portion 46 provided at a terminal end 45 of the shaft tube 44, a shaft hole 47 recessed from the outer disc body 41 into an inside of the shaft tube 44 and inserted with the shaft rod 35 of the internal shaft member 30, and an engagement notch 49 provided at an inner end 48 of the shaft hole 47, as shown in FIG. 5, and engaged with the engagement portion 38 of the internal shaft member 30. The two outer protrusions 42 are shaped like arc strips and arranged alternately with the two drive blocks 18 outside the outer periphery of the inner disc body 31. The shaft tube 44 is sleeved onto the shaft rod 35 of the internal shaft member 30 via the shaft hole 47. The drive portion 46 is shaped like a square rod. However, the shape of the drive portion 46 may vary. For example, the drive portion 46 may have a non-circular cross-sectional outer periphery, or the drive portion 46 may be realized as a tubular portion having a non-circular cross-sectional inner periphery as long as the drive portion 46 can transmit the rotational force. In practice, a suitable tool head (not shown), such as wrench socket, may be coupled to the drive portion 46 for driving a bolt or nut. As shown in FIG. 5, the shape of the inner periphery of the engagement notch 49 is complementarily fitted with that of the engagement portion 38, and thus has two cut flat surfaces 491. As such, the outer shaft member 40 can be driven by the internal shaft member 30 to rotate. In another embodiment, the engagement notch 49 may have a non-circular cross-sectional inner periphery for receiving the rotational force transmitted from the internal shaft member 30.

Figure 2:
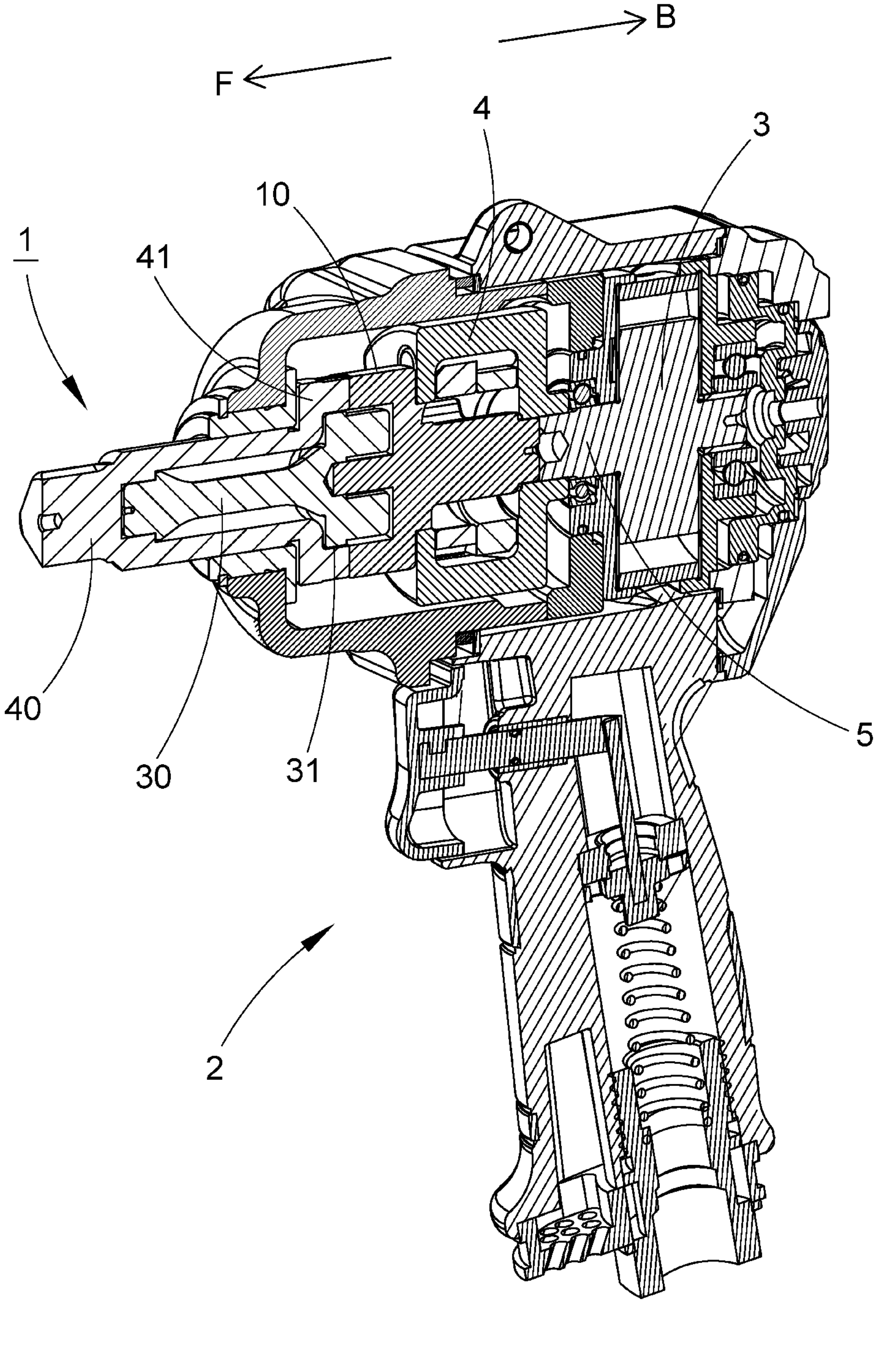
FIG. 2 is a cross-sectional view taken along line 2-2 of FIG. 1.
Figure 3:
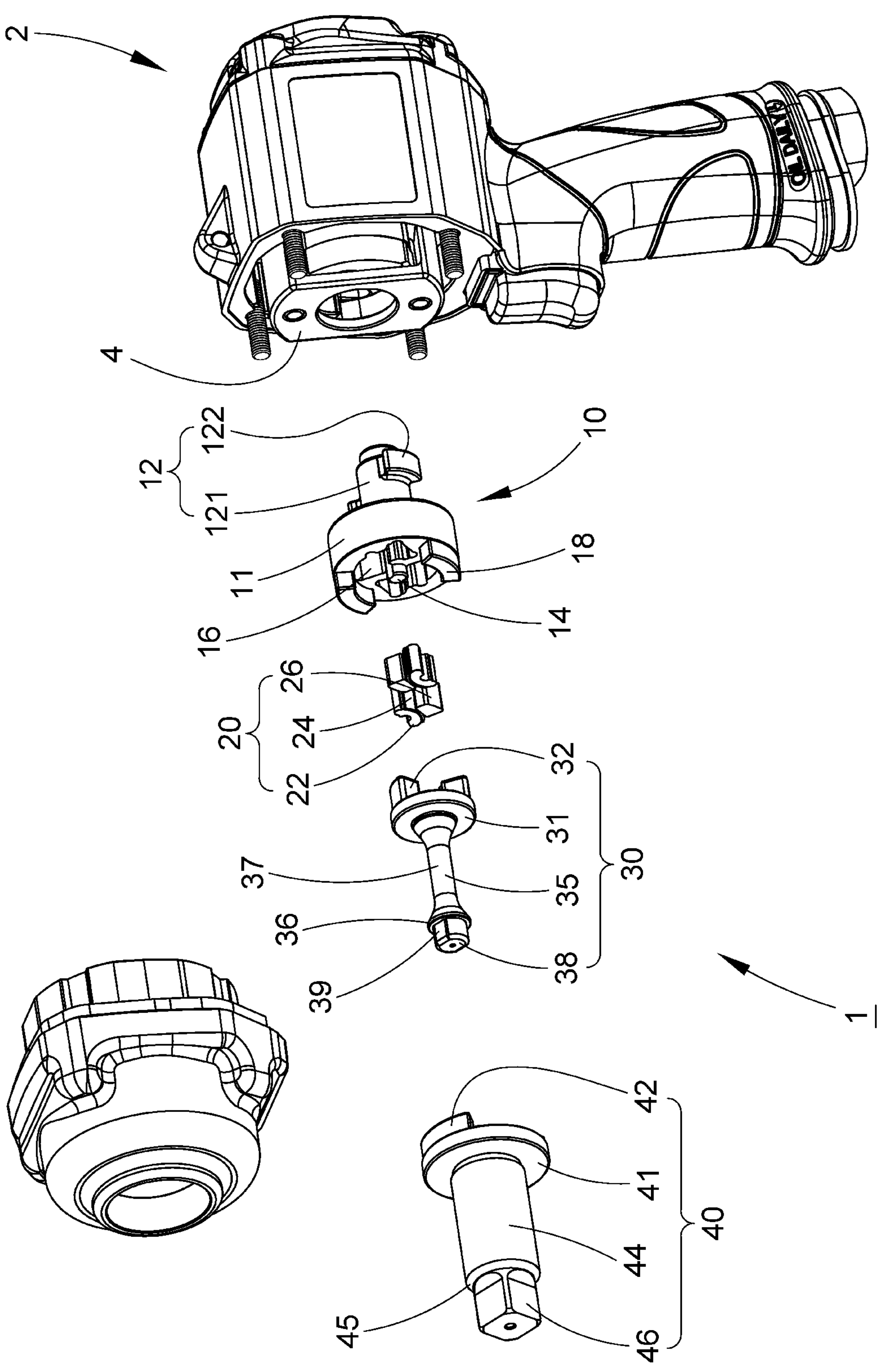
FIGS. 3 and 4 are exploded views of the constant torque module used in the power tool in different viewing angles in accordance with the first embodiment of the present invention.
Figure 4:
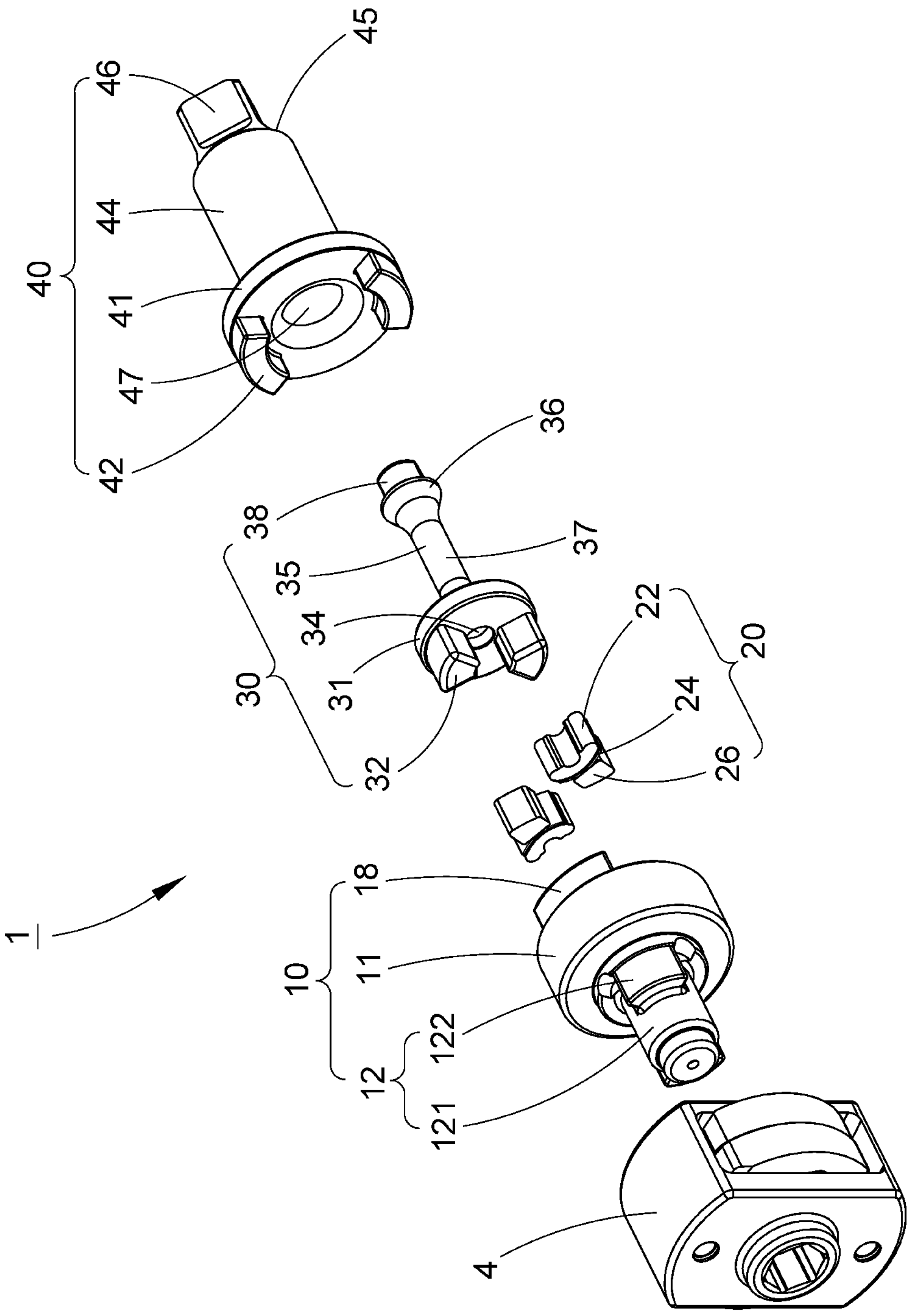
Figure 6:
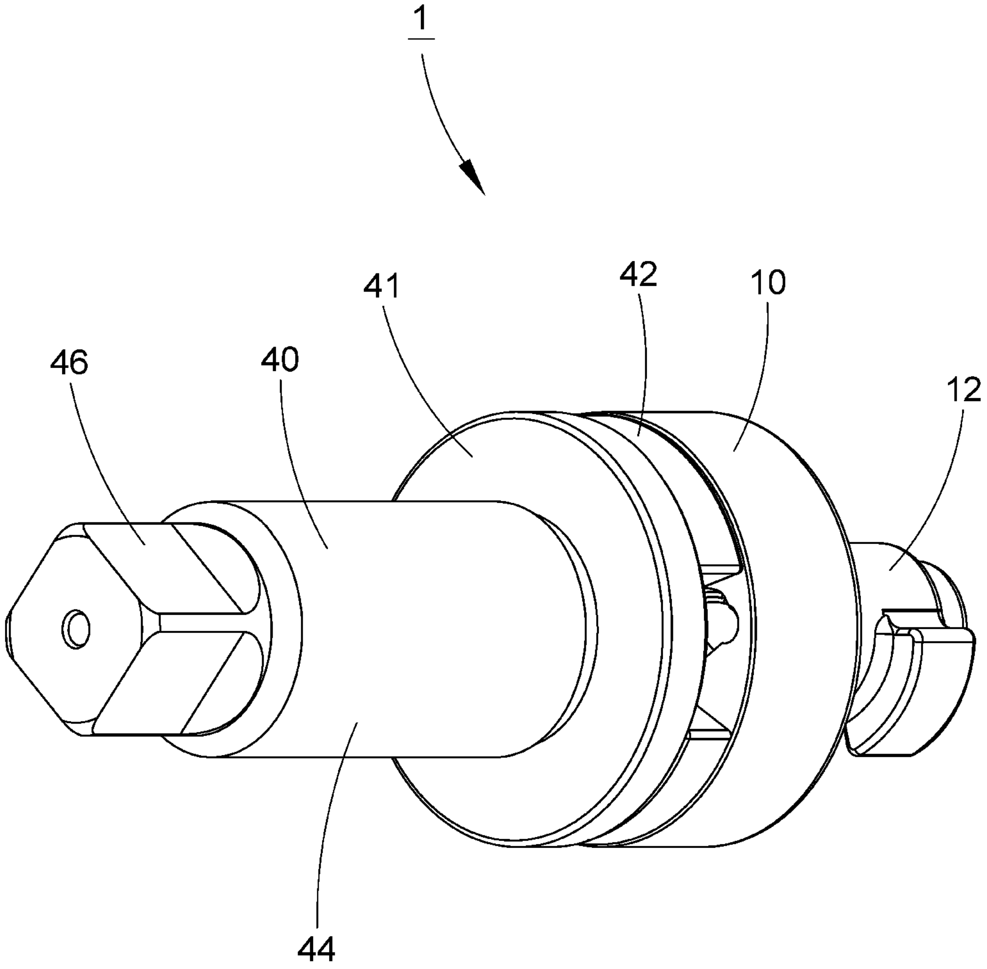
FIG. 6 is a perspective view of the constant torque module used in the power tool of the first embodiment of the present invention.

As shown in FIGS. 2 and 6, the inner disc body 31 is located between the outer disc body 41 and the main body 11 of the transmission ring member 10. When a user would like to loosen a nut and thus operates the power tool 2 to rotate the output portion 4 counterclockwise when it is viewed from the user's viewing angle, the transmission ring member 10 is driven by the output portion 4 to rotate in a first direction D1 (i.e., the counterclockwise direction) as shown in FIG. 7*a*, such that the two drive blocks 18 will impact and contact the two outer protrusions 42 respectively to transmit a rotational force from the transmission ring member 10 to the external shaft member 40. Because the drive blocks 18 and the outer protrusions 42 are distanced from the core shaft 14 at a farther distance, i.e., the arm of force is longer to result in a greater moment of force, a greater torque can be produced. As shown in FIG. 7*b*, at this state, a gap is left between the inner wall of the accommodation 16 and the inner protrusion 32, such that the rotational force from the transmission ring member 10 will not be transmitted to the internal shaft member 30.

Figure 8A:
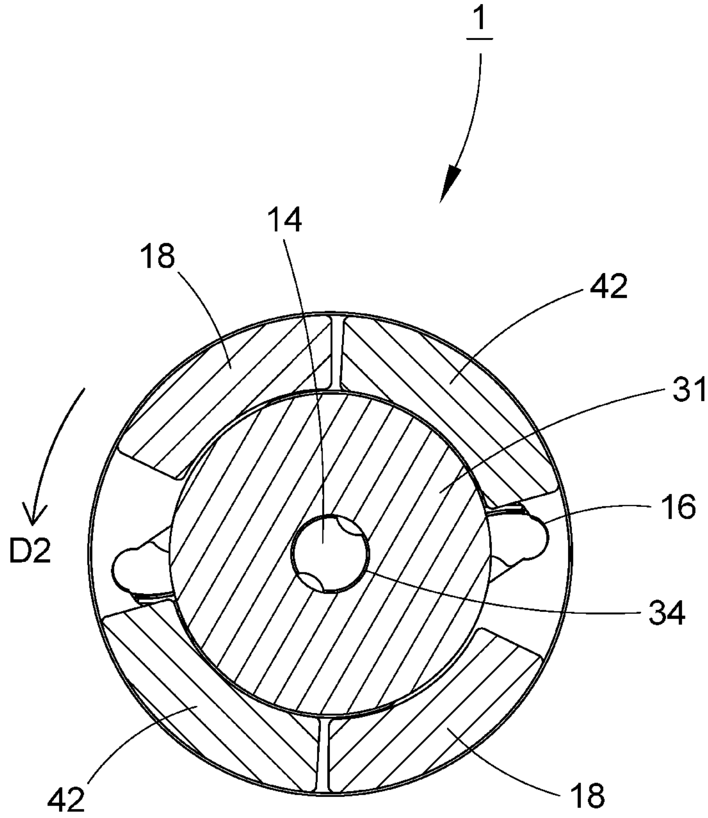
FIGS. 8*a* and 8*b* are schematic cross-sectional views showing the constant torque module is rotated in a second direction reverse to the first direction.
Figure 8B:
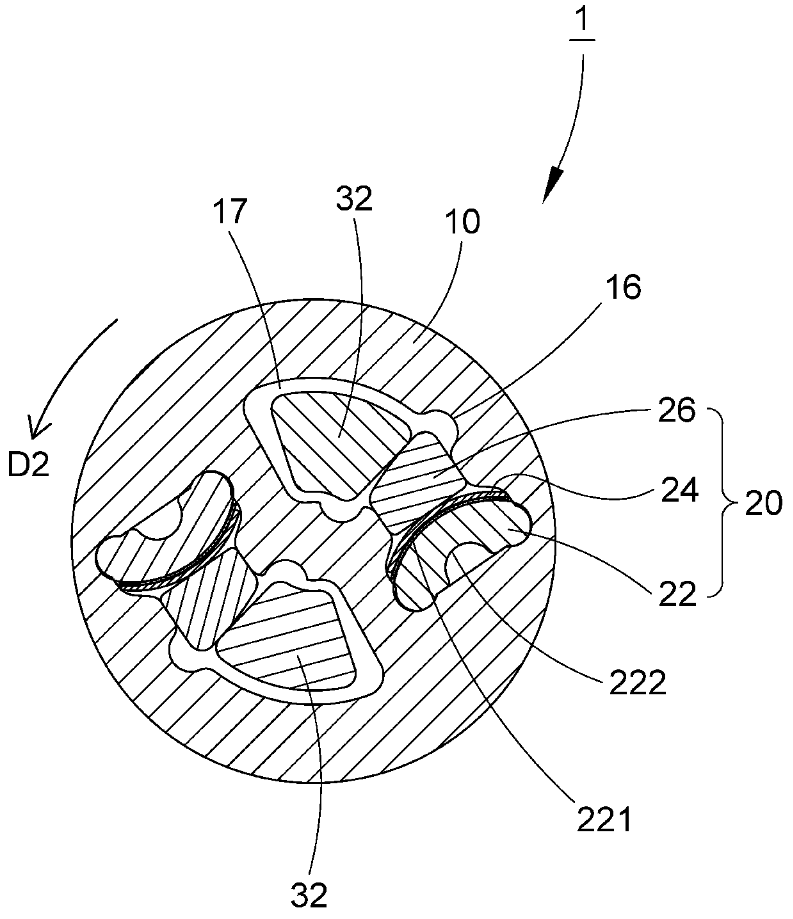

On the contrary, when the user would like to tighten the nut and thus operates the power tool 2 to rotate the output portion 4 clockwise, the transmission ring member 10 is rotated in a second direction D2 (i.e., the clockwise direction) reverse to the first direction D1 as shown in FIG. 8*a*. At this state, the two drive blocks 18 move away from the two outer protrusions 42, such that the rotational force from the transmission ring member 10 will not be transmitted to the external shaft member 40 via the two outer protrusions 42. Instead, as shown in FIG. 8*b*, the two buffer units 20, more specifically the two pad members 26 of the buffer units 20, will impact and contact the two inner protrusions 32 respectively to transmit a reverse rotational force from the transmission ring member 10 to the internal shaft member 30, and then to the external shaft member 40 through the engagement portion 38 and the engagement notch 49. Because the inner protrusions 32 are distanced from the core shaft 14 at a smaller distance, i.e., the arm of force is smaller to result in a smaller moment of force, a smaller torque can be produced. Further, the engagement portion 38 and the engagement notch 49 are also closer to the axis of the core shaft 14, the transmitted torque can be further reduced. Moreover, the thin, elongated structure of the shaft rod 35 of the internal shaft member 30 can absorb the torque due to twist and deformation thereof. With these structural designs, the reverse torque that is finally outputted will be greatly reduced into an extent about one quarter of the counterclockwise output torque according to actual test. That is, when the counterclockwise output torque is about 400 Nm, the clockwise output torque is about 100 Nm. In addition, the value of the clockwise output torque can be set in accordance the customer's requirement so as to achieve the objective of outputting constant torque.

With the above-disclosed structural features, the constant torque module 1 for a power tool 2 provided by the present invention can output different magnitudes of torque when the transmission ring member 10 is driven to rotate in clockwise direction (the second direction D2) and counterclockwise direction (the first direction D1). Because the external shaft member 40 is synchronously rotated with the output portion 4 of the power tool 2, the output rotational speed will not be reduced. As such, no matter counterclockwise rotation or clockwise rotation, the rotational speed can reach 8000 rpm to 9000 rpm, thereby achieving high working efficiency. Further, processing precisions of the components of the constant torque module 1 are not as high as that of the conventional hydraulic mechanism, and the processing of the constant torque module 1 is relatively easy, so that the manufacturing cost thereof can be greatly reduced, resulting in great market potential of the constant torque module 1.

Figure 9:
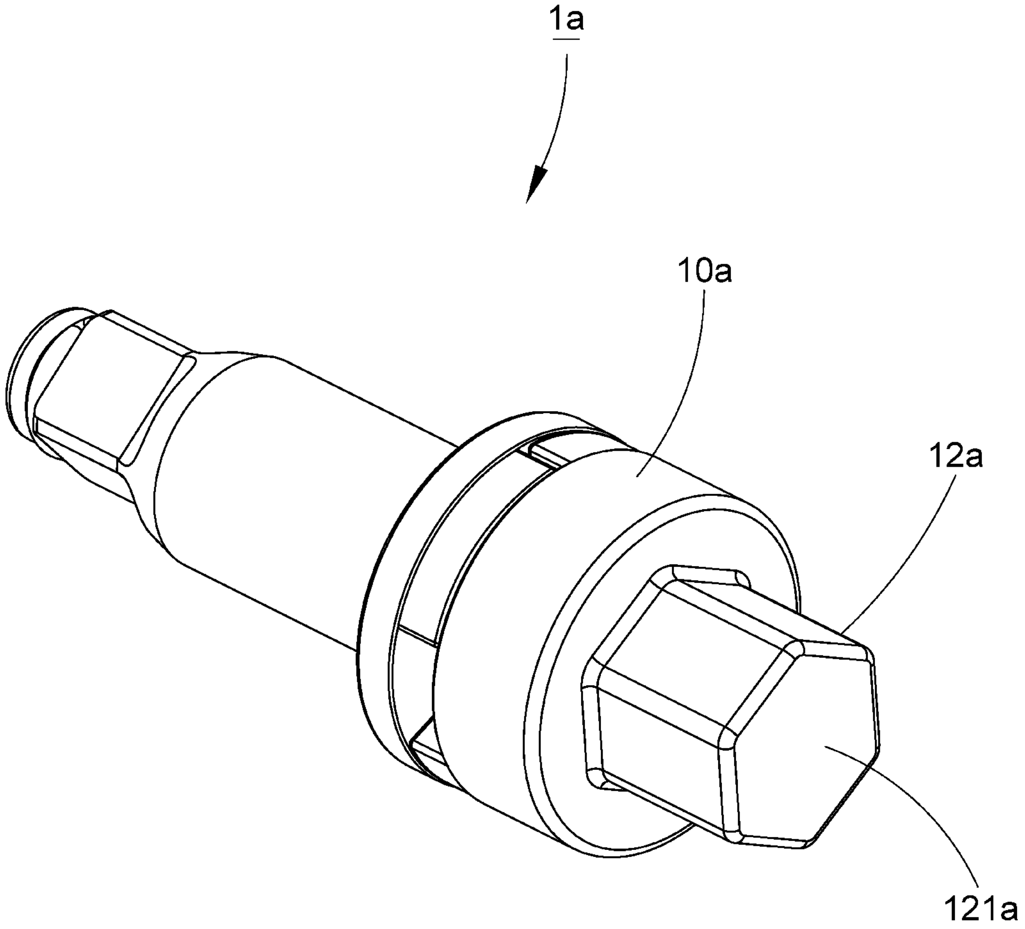
FIG. 9 is a perspective view of a constant torque module for a power tool in accordance with a second embodiment of the present invention.
Figure 10:
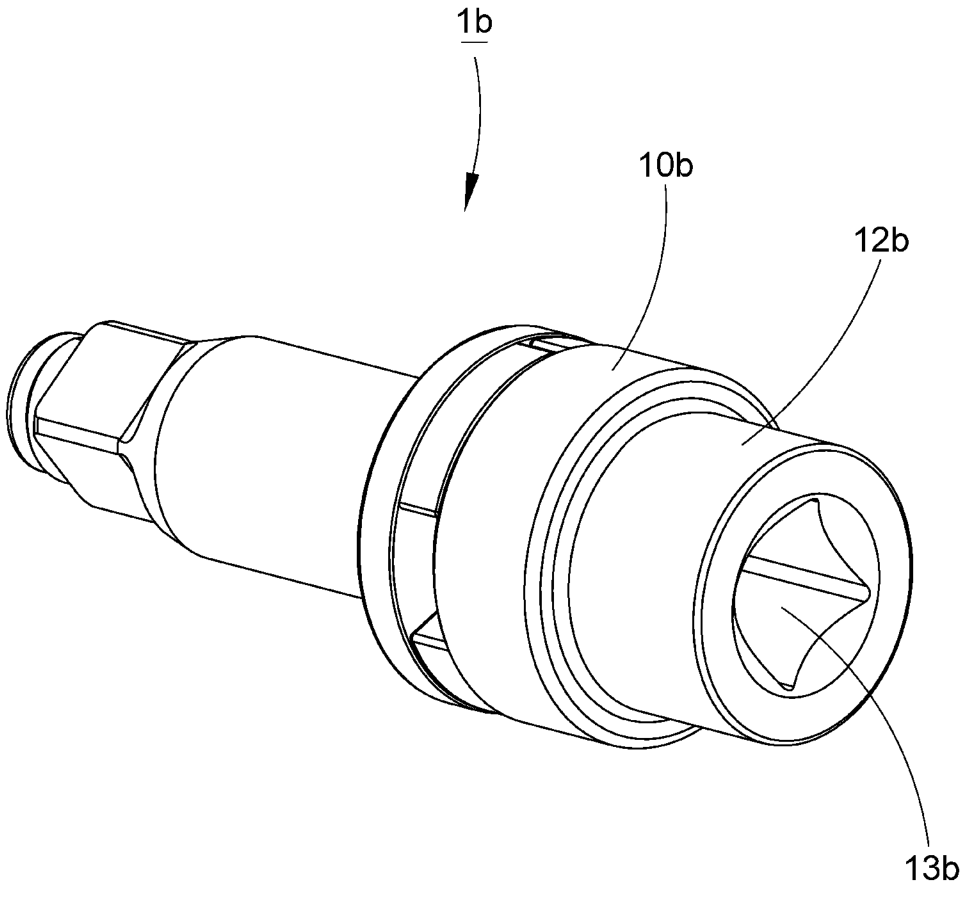
FIG. 10 is a perspective view of a constant torque module for a power tool in accordance with a third embodiment of the present invention.

Based on the technical features of the present invention, various modifications to the constant torque module may be made. For example, FIG. 9 shows a constant torque module 1*a* in accordance with a second embodiment of the present invention, which has a structure basically same as that of the constant torque module 1 of the first embodiment, except that the coupling portion 12*a* of the transmission ring member 10*a* is designed to have a hexagonal rod 121*a* for being associated with a different output portion of a power tool. Further, FIG. 10 shows a constant torque module 1*b* in accordance with a third embodiment of the present invention, which has a structure basically same as that of the constant torque module 1 of the first embodiment, except that the coupling portion 12*b* of the transmission ring member 10*b* is designed to have a rectangular hole 13*b*, such that the constant torque module 1*b* can serve as an accessory part that is capable of being coupled to the rectangular output shaft of commercially available power tools. As such, the constant torque modules 1, 1*a* and 1*b* of the present invention may be applied to various power tools. In fact, the coupling portion of the transmission ring member may be realized as a shaft rod having a non-circular cross-sectional outer periphery, or a coupling hole having a non-circular cross-sectional inner periphery. The buffer unit may be realized by a structure, such as spring, that can absorb acting force. Such variations are not to be regarded as a departure from the spirit and scope of the invention, and all such modifications as would be obvious to one skilled in the art are intended to be included within the scope of the following claims.

What is claimed is:

1. A constant torque module for a power tool having an output portion, the constant torque module comprising:

a transmission ring member including a main body, a coupling portion extending from the main body for being coupled with the output portion, a core shaft extending from a lateral side of the main body opposite to the coupling portion, two accommodations provided at the main body and located at two lateral sides of the core shaft, and two drive blocks extending from the main body in a way that each of the two drive blocks is farther from the core shaft than each of the two accommodations is;

two buffer units, each of which is disposed in a part of one of the two accommodations such that each of the two accommodations remains a receiving space;

an internal shaft member including an inner disc body, two inner protrusions extending from the inner disc body into the receiving spaces respectively, a shaft notch provided at the inner disc body and engaged with the core shaft of the transmission ring member, a shaft rod extending from a lateral side of the inner disc body opposite to the two inner protrusions, and an engagement portion provided at a terminal end of the shaft rod; and an external shaft member including an outer disc body, two outer protrusions extending from the outer disc body towards the main body of the transmission ring member and located outside an outer periphery of the inner disc body, a shaft tube extending from a lateral side of the outer disc body opposite to the two outer protrusions, a drive portion provided at a terminal end of the shaft tube, a shaft hole recessed from the outer disc body into an inside of the shaft tube and inserted with the shaft rod of the internal shaft member, and an engagement notch provided at an inner end of the shaft hole and engaged with the engagement portion of the internal shaft member;

wherein the inner disc body is located between the outer disc body and the main body of the transmission ring member;

wherein when the transmission ring member is rotated in a first direction, the two drive blocks are in contact with the two outer protrusions respectively to transmit a rotational force to the external shaft member;

wherein when the transmission ring member is rotated in a second direction reverse to the first direction, the two buffer units are in contact with the two inner protrusions respectively to transmit a reverse rotational force to the internal shaft member and then the external shaft member through the engagement portion and the engagement notch.

2. The constant torque module as claimed in claim 1, wherein each of the buffer units comprises an elastic member and at least one spring piece located between one of the two inner protrusions and the elastic member.

3. The constant torque module as claimed in claim 2, wherein the elastic member is made of nature or synthetic polymer.

4. The constant torque module as claimed in claim 2, wherein each of the buffer units further comprises a pad member between the spring piece and the one of the two inner protrusions.

5. The constant torque module as claimed in claim 2, wherein each of the elastic member and the spring piece has a convex side protruding towards the one of the two inner protrusions.

6. The constant torque module as claimed in claim 1, wherein the coupling portion of the transmission ring member is a shaft rod having a non-circular cross-sectional outer periphery, or a coupling hole having a non-circular cross-sectional inner periphery.

7. The constant torque module as claimed in claim 1, wherein the shaft rod of the internal shaft member has two end sections and a middle section connected between the two end sections; diameters of the two end sections are greater than a diameter of the middle section.

8. The constant torque module as claimed in claim 1, wherein the engagement portion of the internal shaft member has a non-circular cross-sectional outer periphery, and the engagement notch of the external shaft member has a non-circular cross-sectional inner periphery.

9. The constant torque module as claimed in claim 1, wherein the drive portion of the external shaft member has a non-circular cross-sectional outer periphery, or a non-circular cross-sectional inner periphery.

* * * * *